United States Patent
Sheedy

[11] Patent Number: 5,885,006
[45] Date of Patent: *Mar. 23, 1999

[54] PLAIN BEARING ASSEMBLY

[75] Inventor: Noel Francis Sheedy, Victoria, Australia

[73] Assignee: Plastic Bearings & Housings Australasia PTY. Ltd., Victoria, Australia

[*] Notice: This patent issued on a continued prosecution application filed under 37 CFR 1.53(d), and is subject to the twenty year patent term provisions of 35 U.S.C. 154(a)(2).

[21] Appl. No.: 687,602
[22] PCT Filed: Feb. 8, 1995
[86] PCT No.: PCT/AU95/00058
§ 371 Date: Aug. 8, 1996
§ 102(e) Date: Aug. 8, 1996
[87] PCT Pub. No.: WO95/22011
PCT Pub. Date: Aug. 17, 1995

[30] Foreign Application Priority Data

Feb. 8, 1994 [AU] Australia ............... PM 3762
Jul. 1, 1994 [AU] Australia ............... PM 6606

[51] Int. Cl.[6] ............ F16C 23/04; F16C 17/00; F16C 33/02; F16C 19/00
[52] U.S. Cl. ............ 384/192; 384/275; 384/296; 384/461; 384/901
[58] Field of Search .................. 384/192, 275, 384/295, 296, 901, 461, 212, 195, 196, 197, 198, 199, 200, 416, 417, 418, 202

[56] References Cited

U.S. PATENT DOCUMENTS

| | | | |
|---|---|---|---|
| 2,045,030 | 6/1936 | Thompson | 384/901 |
| 2,123,754 | 7/1938 | Talbot | 384/192 |
| 4,477,197 | 10/1984 | Choate | 384/296 |
| 4,747,810 | 5/1988 | Shepley et al. | 384/192 |
| 5,056,938 | 10/1991 | Ahlman et al. | 384/901 |
| 5,056,939 | 10/1991 | Buse | 384/295 |
| 5,127,745 | 7/1992 | Momose et al. | 384/275 |
| 5,149,006 | 9/1992 | Hitomi | 384/296 |
| 5,192,137 | 3/1993 | Renard | 384/192 |
| 5,219,231 | 6/1993 | Sheedy | 384/192 |
| 5,219,232 | 6/1993 | Adams et al. | 384/901 |

FOREIGN PATENT DOCUMENTS

| | | | |
|---|---|---|---|
| 0146911 | 1/1922 | United Kingdom | 384/461 |
| 0971142 | 9/1964 | United Kingdom | 384/461 |

OTHER PUBLICATIONS 2,789,021; Apr. 1957; Pedersen.

2,822,225; Feb. 1958; Teufel.

4,618,271; Oct. 1986; Li.

3,597,029; Aug. 1971; Marcum.

*Primary Examiner*—Charles A. Marmor
*Assistant Examiner*—Matthew A. Kaness

[57] ABSTRACT

A plain bearing assembly including an inner bearing, outer bearing, and at least one intermediate bearing. The inner bearing has an annular inner bearing surface. The intermediate bearing includes a ring bearing having an annular inner and outer surface. The intermediate bearing also includes bushes rotatably mounted about the inner bearing and rotatable with respect to the bearing ring and outer bearing. The bushes provide a bearing surface adjacent to the annular inner bearing surface of the bearing ring and providing a bearing surface adjacent to the annular outer bearing surface of the bearing ring.

27 Claims, 6 Drawing Sheets

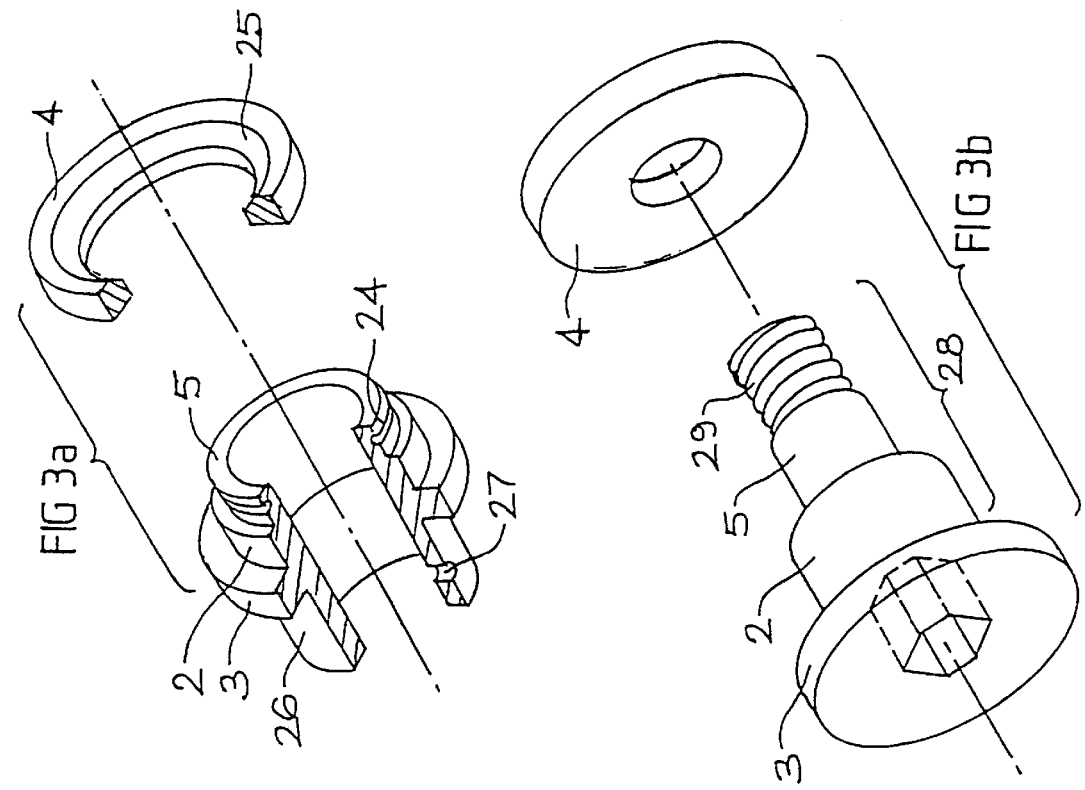
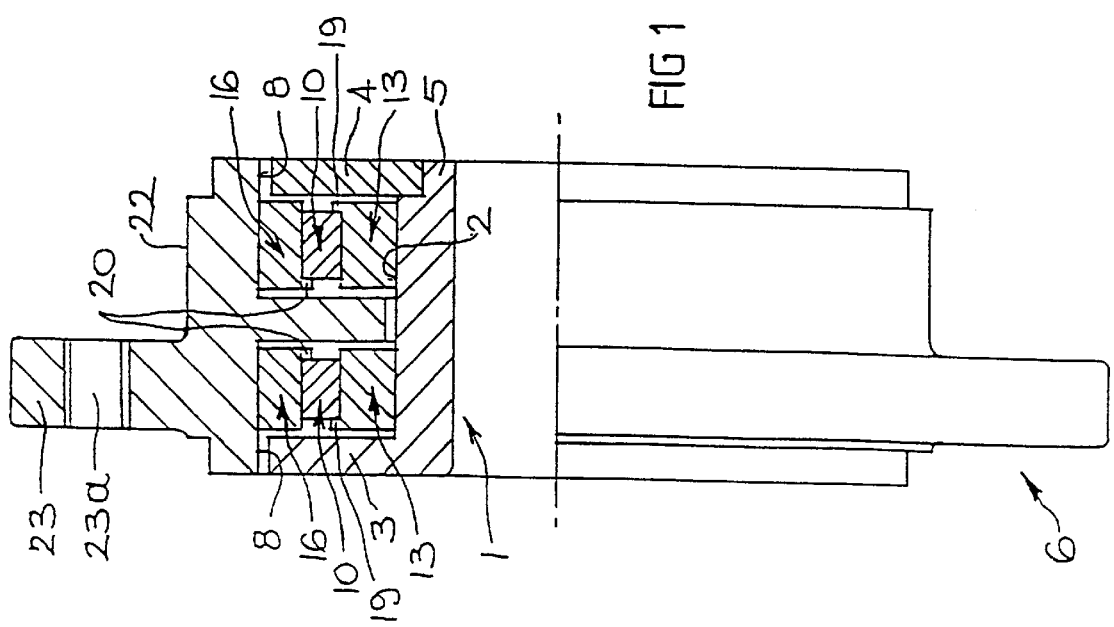

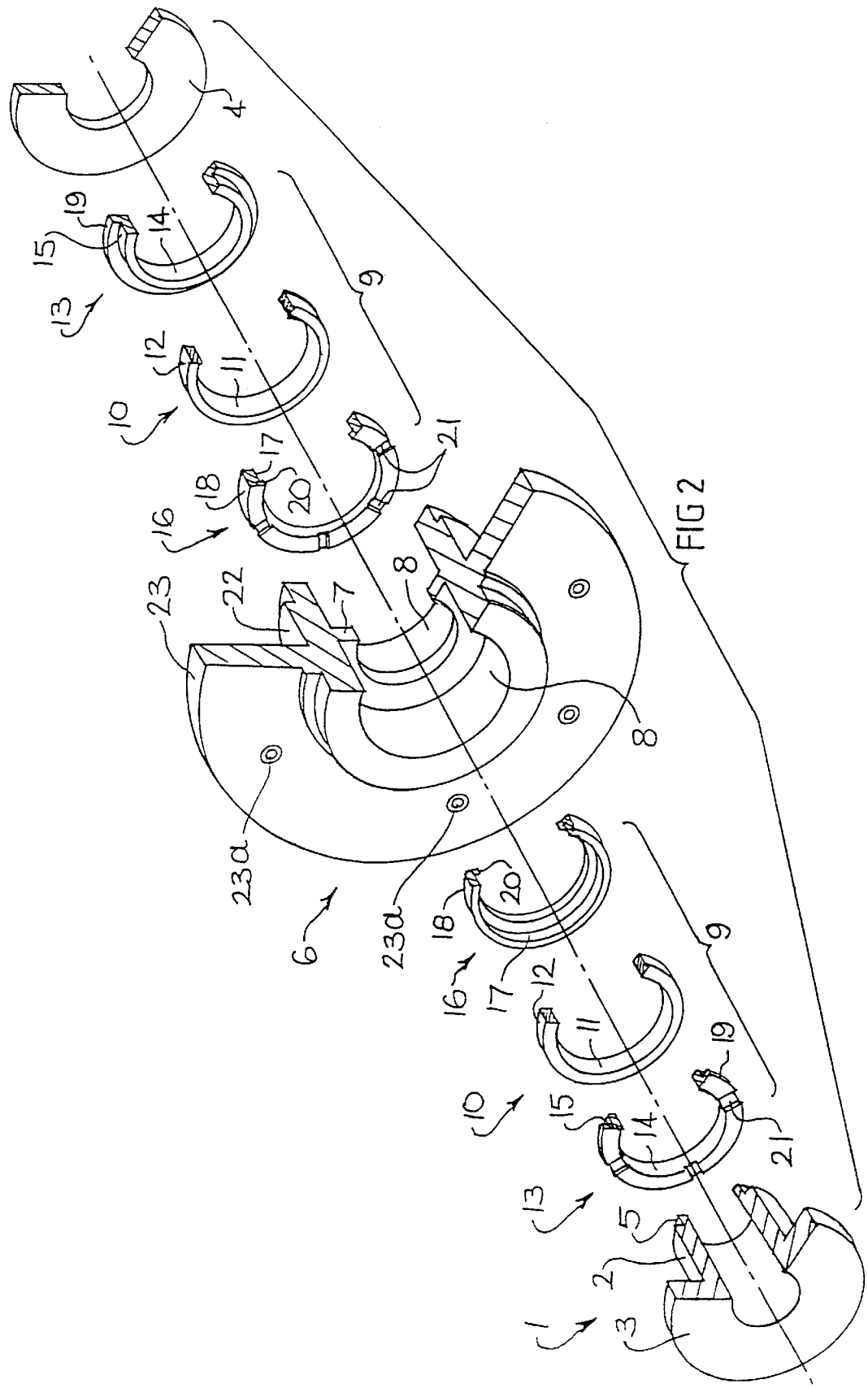

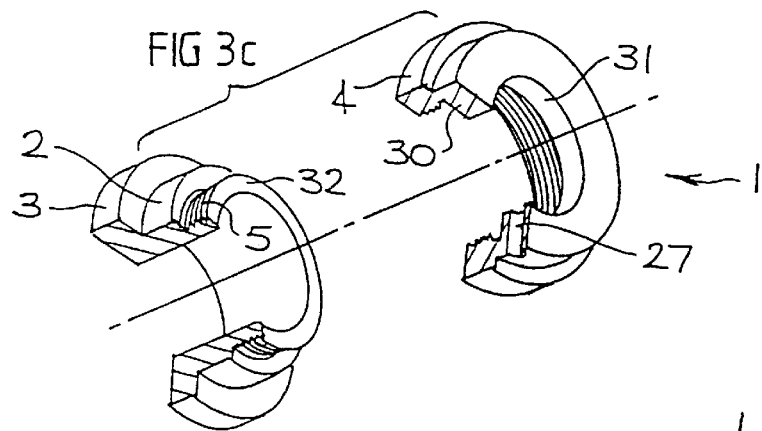
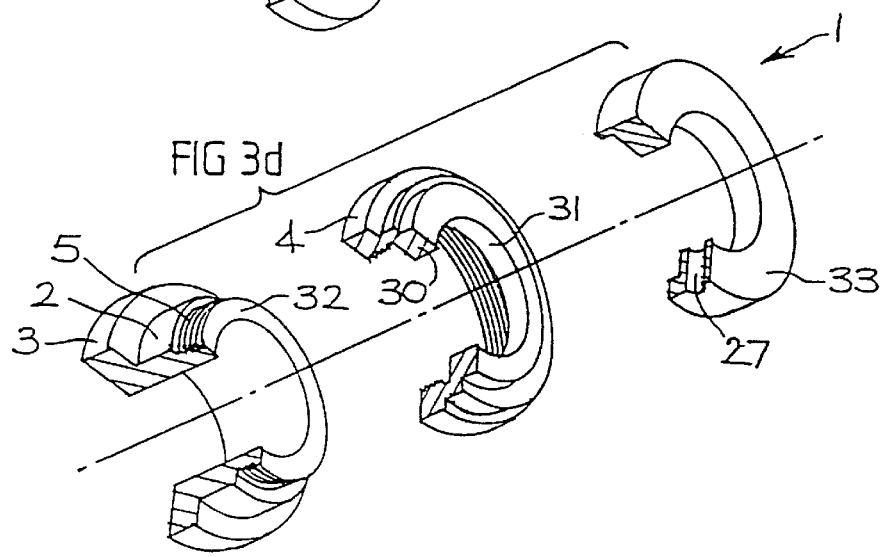
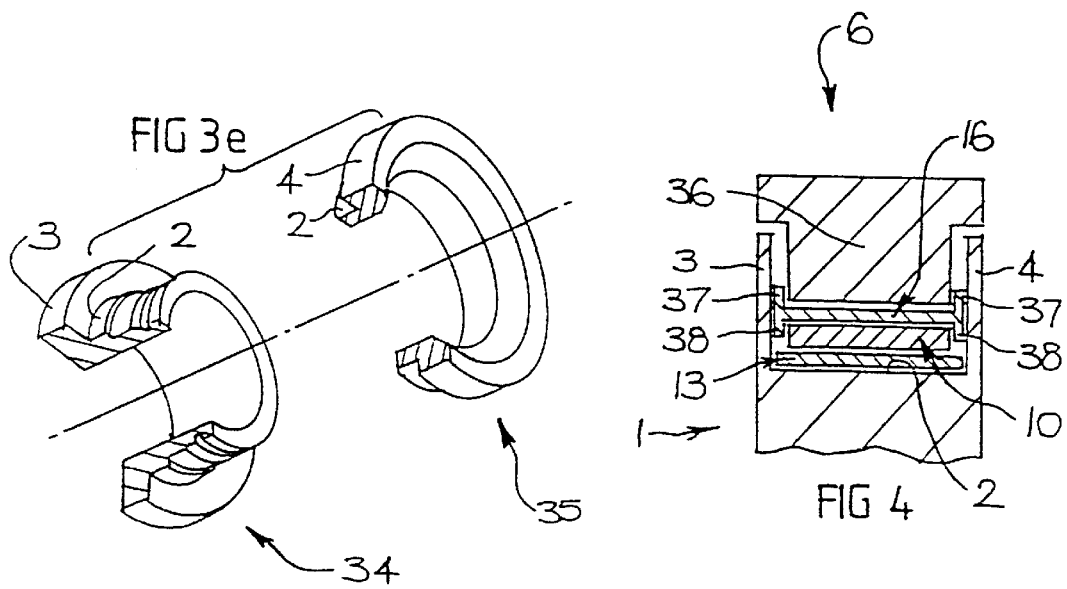

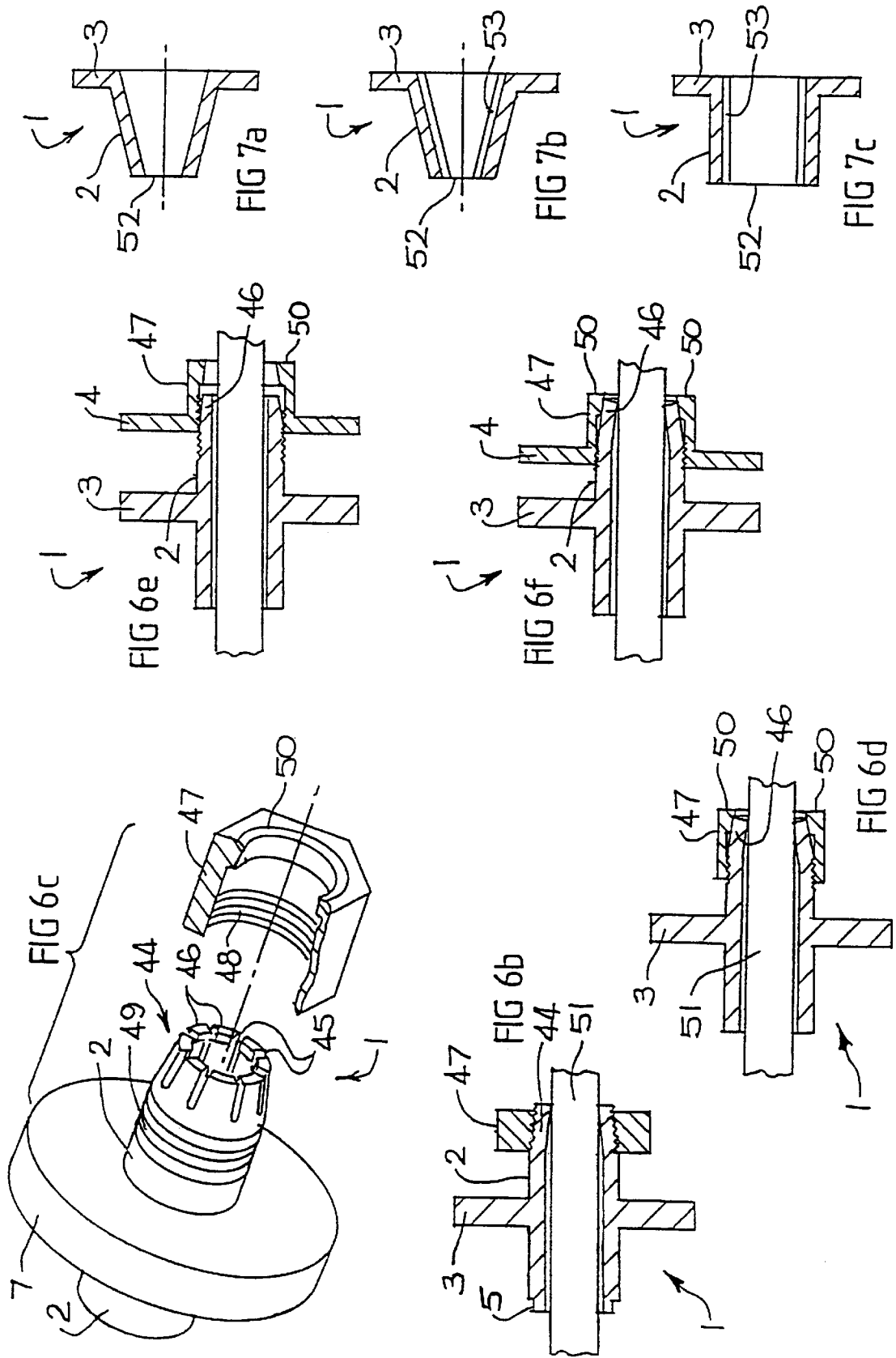

PLAIN BEARING ASSEMBLY

The present invention relates to bearings and bearing assemblies.

Conventional roller bearings consist of an inner race member, an outer race member and roller balls held between inner and outer races by a cage or flanges. Various types of plain bearings are also known in which rolling elements are replaced by a plastic bush. Some plain bearings of this type are able to operate without a lubricant however plain bearings generally suffer from the limitation that the bearing members became fused at high speed and/or under high loads.

Despite the improvements in plain bearings there is need for such a bearing which has a longer service life and/or is able to operate under more severe conditions such as high loads or at high speed for prolonged periods.

According to the present invention there is provided a bearing including an inner bearing having an annular peripheral bearing surface, outer bearing having an annular inner bearing surface and at least one set of intermediate bearing including a bearing ring having an annular inner bearing surface and an annular outer bearing surface and bearing bush means rotatably mounted about the inner bearing and rotatable with respect to the bearing ring and outer bearing the bush providing a bearing surface adjacent the inner bearing surface of the bearing ring and providing a bearing surface adjacent the outer bearing surface of the bearing ring.

The intermediate bearing of the bearing of the invention includes at least one bearing ring and bush. The bush may be in the form of a single bush member comprising two bush rings one inside and one outside of the bearing ring and connected by a web extending adjacent the end of the bearing ring. It is particularly preferred, however, that the bearing bush include an inner bush member rotatably mounted about the inner bearing and rotatable with respect to the bearing ring and having a peripheral bearing surface adjacent the inner bearing surface of a bearing ring and an outer bearing bush rotatably mounted about the bearing ring and having an inner bearing surface adjacent the outer bearing surface of the bearing ring.

The bearing ring may be integrally formed with the inner or outer bearing means however it is preferred that it be rotatable with respect to each of the inner and outer bearing.

In a preferred form of the bearing of the invention one of the inner and outer bearing includes an annular locating flange and a radial bearing surface disposed on each side of the locating flange and the other of said inner and outer bearing includes a pair of collars one collar extending on each side of the flange and the bearing includes two sets of intermediate bearing disposed between facing sides of the collars and locating flange one set on each side of the flange.

Preferably one of the collars, referred to as the thrust collar, is removable from the bearing including the pair of collars such that the other bearing components may be removed and reassembled as is required. It is preferred the thrust collar is detachable from the race provided with a collar at one end of the race a bearing surface and a portion for receiving the thrust collar at the other end of the race. The portion for receiving the thrust collar may be recessed; the recessed portion being on the inner surface when the outer bearing includes said collars and on the outer surface when the inner bearing includes the collars. The thrust collar receiving portion may also be provided with a radial groove to allow the end of the thrust collar receiving portion to be deformed to retain the collar. Alternatively, the thrust collar and collar receiving portion may comprise corresponding threaded portions.

The locating flange, which is preferably present on the inner surface of outer bearing, may be continuous or discontinuous and in the form of circumferentialiy spaced tabs or the like. The locating flange may be in a variety of sections or shapes such a square rectangular, curved, dovetailed, bevelled or the like. Preferably the flange has essentially parallel sides and is disposed at right angles to the axis.

In this preferred form of the invention the intermediate bearing are typically located each set in a recess or chamber defined between bearing surfaces of the inner an outer bearing and the facing sides of each collar and the flange. There may be two or more recesses separated by a locating flange projecting from either the first or second bearing and two or more bush members and/or bearing rings may be located in each of the recesses. For example, two bearing rings may be coaxially arranged and separated from each other and from the inner bearing means by bushes.

The inner bearing means of the present invention most preferably includes an annular outer bearing surface and a pair of collars one at each end of the race. The inner bearing is preferably located within the outer bearing such that the collars of the inner bearing are in face to face relationship with an inwardly disposed flange on the outer bearing. One of the collars is preferably a thrust collar adapted to be removably connected to the inner bearing to enable an annular outer bearing means, annular bearing ring and bearing bushes to be removed from and assembled about the bearing surface of the inner bearing.

The inner bearing means may include a bore for receiving a shaft or the like. The bore may be of any suitable shape for example it may be of circular, oval, triangular, square, hexagonal, rectangular or other configuration. Further, where the inner bearing includes a bore the bore may be tapered between one end and the other and may include a spline, gear teeth, it may be serrated or include other means for engaging a drive shaft or the like.

Where the inner bearing includes a bore a receiving a shaft or the like the inner bearing may be in the form of a sleeve and include an axially extended portion which includes for fixing the bearing to the shaft. The axially extended portion may include one or more holes for receiving a grub screws or may be constrictable and be provided with contrictor means adapted to urge the constrictable portion into locking engagement with the shaft.

The inner race portion of the inner bearing may be provided with a threaded portion to engage a correspondingly threaded thrust collar. In this form, the thrust collar may also include an additional annular flange having a bore corresponding to an inner race bore, and having a threaded radial aperture therethrough to receive a grub screw or the like. Alternatively, the thrust collar may be provided with means for engaging an annular eccentric collar having an aperture capable of receiving a grub screw or the like for fixing the bearing to a shaft located in the bore. In another alternative form, the inner bearing comprises an extended portion in the form of an annular axial flange. This axial flange may also have an aperture therein suitable to receive a grub screw or the like, for securing the bearing to a shaft or the like.

The bush members and the bearing ring of the intermediate bearing are typically coaxial and preferably there are two coaxial sets of intermediate bearing means each set comprising at least one intermediate member and at least two bearing bushes and being located one set in each of two recesses defined by inner and outer bearing.

It is preferred that the bearing ring is of smaller axial width than at least one and preferably two of the bearing bushes. Further, the Applicant has found that operation of the bearing is significantly improved where at least one of the bearing bushes in each set of intermediate bearing includes one or more lips which cooperate with the bearing ring to retain the ring spaced apart from the facing sides of the flange and collar.

The bushes may have a lip adjacent one edge thereof and extending adjacent an edge of the bearing ring thereby preventing the bearing ring from directly engaging the inner or outer bearing members. Preferably each of the bearing bushes has a lip and the bearing bushes adjacent the inner and outer circumference of the bearing ring cooperate such that the respective lips are located adjacent opposing ends of the intermediate bearing ring.

In the most preferred embodiment one of the lips radiate from adjacent the side of the inner bearing bush and the other lip is internally disposed adjacent the opposite side of the outer bearing bush and the flanges coact to provide alignment of the ring and to provide axial bearing surfaces between the bearing ring and inner and outer bearing means. Radiating grooves circumferentially spaced on the outer face of the bush lips are also preferred and are believed to aid in heat dissipation and enhance the performance of the bearing.

The bearing of the present invention may be used as wheel bearings for any type of vehicle, such as motor cars, motor cycles, tractors, bicycles, and trucks or the like, and also tractors, bicycles, and trucks or the like, and also trailers of any type such as caravans, and boat or car trailers or the like. The bearing of the present invention may also be used directly as a wheel, as a surface levelling or finishing roller, or as any other form of a direct load carrying rolling member in a vehicle, agricultural implement or the like.

In another embodiment the bearing of the invention is in the form of a cam follower wherein the first bearing comprises an inner race stud together with a thrust collar. The inner race stud may be similar to a conventional bolt, having a head, an axially adjacent locating shaft portion providing a peripheral bearing surface and a threaded shaft portion axially adjacent to the locating shaft. The head if the bolt may define the inner race collar and the threaded shaft may receive a thrust collar which may include a cooperating thread in its inner circumference or the thrust collar may be secured by a threaded locking nut. The thrust collar may take the form of an annular washer or the like.

The bearing of the invention may further comprise a housing for receiving the outer bearing such as a pillar block housing two or more hole flange housing.

It will also be understood by a person skilled in the art that the external surface of the outer bearing may be of any cross-section. The surface may be cylindrical, convexly or concavely curved, tapered, conical or frustoconical, or any combinations of shapes, dependent upon specific requirements and intended use. For example, the bearing may be substantially rectangular so that the bearing itself may be rigidly secured to another member as required.

The outer bearing may have a convex outer surface particularly a spheral section to enable the outer bearing means to be received into a housing having a corresponding concave inner surface whereby the outer bearing means may pivot within the housing to allow it to align with a shaft or the like. Such a housing may be a pillar block housing, a 2- or more hole flange housing, a hanger type housing to allow the bearing to be used on a conveyor system for suspending articles from a conveyance line or may comprise sprockets or gears about its periphery.

The outer bearing means may also comprise protrusions such as sprockets gear teeth or tabs or the outer bearing may have a peripheral annular groove to enable it to engage a belt or pulley. An outer bearing means including an outer surface having one or more V-shaped grooves may also be used.

The outer bearing may include components for fixing the bearing for operation. For example, where the bearing is to be used as a wheel hub it may include a radial flange with axial holes circumferentially spaced about the radial flange for fastening the bearing to a wheel. The outer bearing may also be shaped to act as a pillar block housing, or a 2- or more hole flange housing or the like.

One or more of the inner bearing, outer bearing, bush members and bearing ring may be split radially to form two annular portions with abutting faces or may be split axially to form abutting semicircular portions which together form the annular bearing component. The split components may include engaging portions such as corresponding protrusions and recesses or where the bearing is a self aligning bearing it may be preferred to use a split housing to enable portions of the housing to be assembled about the bearing. Alternatively a housing comprising a convex inner surface and a pair of diametrically opposed slots may be used to allow the bearing to be inserted or removed from the housing when aligned with the slots and at right angles to the housing and to be pivoted within the housing to align with a shaft or the like.

In the bearing of the invention, the bearing bushes will, during operation, typically oscillate between a condition in which they are stationary with respect to the bearing surface of smaller circumference and rotate with respect to the bearing surface of greater circumference and a condition in which they are stationary with respect to the bearing surface of greater circumference and rotatable with respect to the bearing surface of smaller circumference.

This oscillating action during operation, particularly when at least two bushes are present one inside and one outside the bearing ring, significantly improve the operating life of the bearing and reduce wear of the bearing surfaces even a very high speeds and under light load.

The adjacent bearings surfaces of the bearing of the invention are typically formed of different materials. Thus the bearing surface of the inner and outer bearing means and bearing ring may be formed of one material while the bearing surfaces of the bushes are formed of a different material. It is therefore particularly preferred in order to provide a long service life and the most effective performance that the bearing bush means be constructed of a different material to the inner and outer bearing means and the bearing ring. Preferably one of the group of components selected from a first group consisting of the inner bearing the outer bearing and the bearing ring and a second group of consisting of the bearing bushes are formed of a plastics material and the other of said first and second group of components is formed of metal. Most preferably each of the inner bearing, outer bearing means and bearing ring is formed of metal and the bearing bushes are formed of plastics material.

The bush members of the present invention are preferably fabricated from a thermoplastic polyester resin and the inner and outer bearing are preferably made from a corrosion proof metal such as stainless steel, aluminum or the like (although other metals may be used) may be coated with a hard material such as a titanium nitride or ceramic coating or the like. Additionally, all of the components may be made of plastics material, for example, the outer bearing means, the bearing ring and the inner bearing means may be of one plastics composition while the bearing bushes are of a different plastics material. However, the outer and inner bearing and bearing ring may be made of synthetic polymeric material, and the bush members may be made from a corrosion proof metal or other metals which may be coated as above.

The bush members may be fabricated or moulded from a synthetic polymeric material or materials, such as PTFE, CTFE, PEEK, ACETAL, polyimide, poly(amide/imide) unreinforced or a partially crystalline thermoplastic polyester, for example polyethylene terephthalate. Materials from which the components of the present invention may be made include plastics, ceramics, glass, pure carbons, carbon fibres, graphite impregnated materials, kevlar, phosphorous bronze or the like and may include combinations thereof. It will be understood by a person skilled in the art that the selection of the optimum material will be dependent upon the particular application required of the bearing. For instance, where the bearing is being used in a corrosive atmosphere due to the presence of a particular type of chemical, a material would be selected that was resistant to that type of corrosion. Similarly, if metals are used in the bearing, then the same considerations would apply. For instance, if rusting was not perceived to be a problem, mild steel may be used. Alternatively, 316 stainless steel may be used. or, 410 stainless steel may be used. Aluminum may also be used and the metals may be impregnant with a polymer such as PTFE.

As hereinbefore described the inner bearing means may be included a sleeve adapted to receive a shaft and the sleeve may be provided with means for fixing the bearing to a shaft.

We have found that alignment of the bearing and performance of the bearing on a shaft may be enhanced if the sleeve has a constrictable portion.

In a further aspect the invention provides a bearing for a shaft comprising an inner bearing including a sleeve for receiving the shaft and having an annular peripheral bearing surface and an outer bearing means having an inner bearing surface rotatably mounted about the sleeve wherein the sleeve comprises an annular constrictable portion and constrictor means for providing annular constriction to force the constrictable portion into locking engagement with the shaft.

The annularly constrictable portion preferably comprises a series of slots circumferentially spaced about the sleeve and generally aligned with the axis on the sleeve so that the portions of the sleeve between the slots are radially inwardly deformable in response to a constriction force from the constrictor.

The constrictor typically includes a bore adapted to be received on the sleeve and the sleeve and constrictor preferably include a corresponding engaging component, such as threaded portions, to urge the constrictor along the sleeve so that the inner circumference of the constrictor impinges upon the constrictable portion of the sleeve to cause constriction thereof. The constrictor is preferably a nut or threaded collar.

In a particularly preferred embodiment the sleeve of the bearing extends beyond the race and the annularly constrictable portion is located adjacent a protruding end of the sleeve. In this embodiment it is preferred that the slots extend from the end of the sleeve in alignment with its axis and are circumferentially spaced to form a multiplicity of radially inwardly deformable segments. The constrictor is receivable on the slotted end of the sleeve and the inner circumference of the constrictor provides an inward force to the segments as it is urged along the sleeve to thereby lock the sleeve onto a shaft. The constrictable portion of the sleeve preferably has an outer surface inwardly tapering toward the slotted end of the sleeve and the constrictor is adapted to be received onto and cooperate with the sleeve to impinge upon the tapered portion of the sleeve to force the constrictable portion inward. Alternatively or in addition to the tapering of the constrictable portion the inner surface of the constrictor may inwardly taper to provide a constricting force to the constrictable portion of the sleeve as it is urged onto the sleeve. The constricting force may alternatively be provided by a flange on the inner surface of an annular constrictor means.

Preferably the sleeve and constrictor include threaded portions which cooperate such that relative ratation of the cooperating threaded portions urges the annular constrictor means along the sleeve and against the tapered surface of the constrictable portion.

The slotted end of the annular constrictable portion may narrowingly taper and be threaded so that the constriction impinges upon the tapered sides of the constrictable portion during relative rotation of the constriction and constrictable portion during relative rotation of the constriction and constrictable portion. Alternatively the sleeve may be threaded between the slotted constrictable portion and the bearing race and the annular constriction may include a threaded portion and a portion which impinges upon the tapered constrictable portion.

The constrictable sleeve is particularly useful in bearings including intermediate bearings. The sleeve and intermediate bearing of the invention may include an annular flange and mutually abutting rings respectively as described in U.S. Pat. No. 5,219,231. The sleeve comprises an annular flange and the outer being includes a pair of mutually abutting rings which together define a recess for receiving the annular flange to allow relative rotation between the race and sleeve and wherein the mutually abutting surfaces of the rings include an annular flange axially extending from one of said rings and a recess in the other ring, said axially extending flange and corresponding recess cooperating to retain mutual alignment of the rings.

The constrictable portion is preferably resilient so that the sleeve is movable on the shaft when the locking force of the constrictor means is removed.

Some examples of practical arrangements of the invention will now be described with reference to the accompanying drawings. However, it is to be understood that the following description in no way limits the generality of the invention as described above.

In the drawings:

FIG. 1 is a part cross sectional view of a bearing of the invention.

FIG. 2 is a partial perspective view of the components of the bearing of FIG. 1.

FIGS. 3a to 3e are partial perspective views of alternative constructions of the inner bearing means of FIG. 1.

FIG. 4 is a further embodiment of the bearing of the invention.

FIG. 6b is a cross section of the inner bearing means of FIG. 6a which is locked into a shaft.

FIG. 6c is partial perspective view of an inner bearing means.

FIG. 6d is a cross section view of the inner bearing means of FIG. 6c which is locked into a shaft.

FIGS. 6e and 6f show a further embodiment of a lockable inner bearing means in position in which it is movable (6e) and locked (6f) into a shaft.

FIGS. 7a to 7c show cross sections of alternative inner bearing means for the bearing of the invention.

Figure 5A:
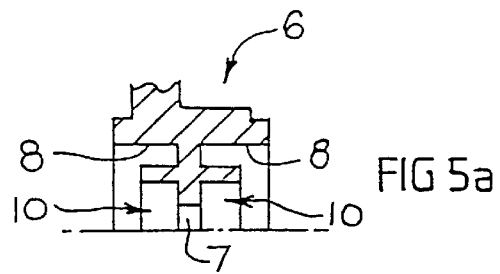
FIG. 5a is a part cross section view of an alternative outer bearing means of the bearing of FIG. 1.

Illustrated in FIGS. 1 and 2 are components of the bearing shown assembled in FIG. 1 and with the components separated in FIG. 2.

Illustrated is an inner annular bearing (1) in the form of a sleeve for receiving a shaft and having a peripheral bearing surface (2) which forms the annular inner race. The inner bearing further includes a pair of shoulders or collars (3) and (4). One of the collars (3) is fixed adjacent the peripheral bearing surface (2) and the other collar (4), referred to as a thrust collar, may be removed to allow assembly and disassembly of the bearing and is received upon an annular recessed portion (5) of the inner annular bearing (1) on the side of the peripheral bearing surface (2) remote from the fixed collar (3).

The outer bearing means (6) is an outer race having an inwardly disposed locating flange (7) which separates two inner radial bearing surfaces (8) on the outer bearing (6). The locating flange has parallel sides which, when the bearing is assembled, are in face to face relationship with the inside sides of collars (3,4). The peripheral bearing surface (2) and collars (3,4) of the inner bearing (1) together with the inner radial bearing surfaces (8) and sides of the inwardly disposed locating flange (7) on the outer bearing (6) define two annular chambers or recesses. In each of the chambers there is located a set of intermediate bearing members (9) including a bearing ring (10) having inner and outer bearing surfaces (11,12) on its inner circumference and its outer circumference, respectively an inner bearing bush (13) having inner and outer bearing surfaces (14,15) on its inner circumference and outer circumference, respectively, (15) disposed between the peripheral bearing ring (10) and the bearing surface (2) of the inner annular bearing (1) and an outer bearing bush (16) having inner and outer bearing surfaces (17,18) on its inner circumference and its outer circumference, respectively, located between the bearing ring (10) and the inner radical bearing surfaces (8) of the outer bearing (6). The inner annular bearing (1), outer bearing means (6) and bearing ring (10) are formed of a metal such as aluminum which may be impregnated with a plastic coating such as PTFE. The bearing bushes (13,16) are formed of a plastics material such as a polyimide.

The bearing surface (14) of the inner bearing bush is disposed adjacent the peripheral bearing surface (2) of the inner annular bearing (1). The bearing ring (10) inner and outer bearing surfaces (11,12) lie adjacent the outer bearing surface (15) of the inner bush member (13) and the inner bearing surface (17) of the outer bearing bush (16) respectively. The outer bearing surface (18) of the outer bush member (16) lies adjacent and is rotatable with respect to the bearing surface (8) of the outer bearing means (6). Although each of the annular bearing components (1, 6, 9, 13, 16) is rotatable with respect to any other of the annular bearing components (1, 6, 9, 13, 16) rotation of the inner annular bearing (1) with respect to the outer bearing (6) has been found to cause the bushes to oscillate, i.e., alternate between a condition in which they are stationary with respect to the adjacent bearing surface of smaller circumference and rotatable with respect to the bearing surface of greater circumference and a condition in which the bearing bush is stationary with respect to the adjacent bearing surface of greater circumference and rotatable with respect to the adjacent bearing surface of smaller circumference. In particular during operation the inner bearing bush (13) (in each recess) in operation oscillates between a condition in which it is stationary with respect to the inner bearing (1) and rotatable with respect to the intermediate bearing ring (10) and rotatable with respect to the inner annular bearing (1). The outer bearing bush (16) oscillates between a condition in which it is stationary with respect to the intermediate bearing ring (10) and rotatable with respect to the outer bearing (6) and condition in which it is stationery with respect to the outer bearing (6) and rotatable with respect to the intermediate bearing ring (10). As a result the bushes appear to float between these conditions and the bearing ring also floats, rotating intermittently under the influence of either the inner or outer bearing.

Each of the bearing bushes (13 and 16) has a lip (19,20) adjacent on edge thereof. The lips (19,20) of the inner and outer bearing bushes (13, 16) are disposed each adjacent opposite ends of the intermediate bearing ring (10) so that they retain alignment with the intermediate bearing ring (10) and prevent the intermediate bearing ring (10) from directly engaging the first or second bearing members (1,6) by providing an axial bearing surface between ends of the bearing ring (10) and the facing sides of the locating flange (7) and collar (3 or 4). The lip (19,20) in each bearing bush (13,16) has circumferentially spaced radiating grooves (21) on its outer face. The grooves reduce the effects of friction and assist in dissipation of heat during operation. Grooves may also be provided on the other end of each bush.

The bearing of the invention may be assembled by placing one set of intermediate bearing (9) on the peripheral bearing surface (2) of the inner annular bearing means (1) such that the lip (19) of the inner bush (13) is adjacent the inner side of the fixed collar (3). The outer bearing (6) may then be located about the peripheral bearing surface (2) of the inner annular bearing (1) and the intermediate bearing (9) such that the lip (20) of the outer bush (16) is adjacent to the side of the locating flange (7) facing the collar (3). A second set of intermediate bearing (9) is mounted between the bearing surfaces (1), (8) so that lip (20), if the outer bush is adjacent the locating flange (7) and the thrust collar (4), is fastened onto the recessed end (5) adjacent to the peripheral bearing surface (2) so that its inner side is adjacent the lip (19) of the outer bush (13).

The intermediate bearing means (9) retain spacing between the inner and outer bearing (1,6). The outer bearing (6) extends about the collars (3,4) and ends flush with the outside of the collar. The intermediate bearing (9) retain spacing between the outer bearing (6) and periphery of the collars (3,4) and the outer bush (16) may extend between the outer bearing and periphery of the collars (3,4) to provide a seal between the inner and outer bearing (1,6).

The inner circumference of the locating flange (7) is also spaced from the bearing surface (2) of the inner bearing (1) by intermediate bearing (9).

The outer peripheral surface of the outer bearing means (6) may be provided with means for fixing a bearing. In FIG. 1 the outer bearing member includes a radial fixing flange (23) on its outer circumference (22). Circumferentially spaced holes (23a) are located about the fixing flange 23 which allow the bearing to be fixed to a wheel so it is used as the bearing hub of the wheel.

Referring to FIGS. 3a to 3e the inner bearing of the invention may include components for attaching the thrust collar to a shaft. The inner bearing (1) is provided with an annular recess (5) adjacent one end. The thrust collar (4) is annular and its inner circumference is receivable on the recessed portion (5) of the inner bearing (1) to thereby provide two collars (3,4) spaced at either end of the inner bearing surface (2) between which collars (3,4) the intermediate bearing (9) and locating flange (7) of an outer bearing (6) are received.

As shown in FIG. 3a the for attaching the thrust collar (4) may be by an inner annular groove (24) about the recessed portion (5) to allow the end of the recessed portion (5) to be deformed or flared over the outer face of the thrust collar (4). The outer face of the thrust collar may have a chamber (25) adjacent the inner edge of the outer side wall to facilitate flaring of the end of the recess (5).

The inner bearing (1) further includes an extended axial portion (26) provided with a radial hole (27) for receiving a grub screw to enable the inner bearing means (1) to be removably fixed onto a shaft.

FIG. 3b shows an inner being means (1) in the form of an inner race stud (28). The inner bearing (1) has a solid shaft provided with a collar (3) at one end, a peripheral bearing surface (2) adjacent and a recessed portion (5) for receiving the thrust collar (4) adjacent the other end of the bearing surface (2). The recessed portion is threaded (29) for receiving a nut which may retain the thrust collar (4) adjacent the bearing surface (2). Alternatively the collar (4) itself may be threaded on its inner circumference to engage and allow it to be fastened on the threaded recessed portion (29).

FIGS. 3(c) and 3(d) shows an inner bearing means in the form of a sleeve for receiving a shaft and the recessed portion (5) and inner circumference of the thrust collar (4) have cooperating threaded portions so that the collar (4) may be fastened on the recessed portion (5) adjacent the bearing surface (2). The thrust collar (4) is provided with an additional annular flange (30) on its outer side and the flange has a smaller inner circumference than the threaded portion of the collar so that it lies adjacent one end of the inner bearing means sleeve (32) when the collar is fastened into the recessed portion (5) and may provide a stop to determine spacing between the collars (3,4). In FIG. 3c the additional annular flange (30) is provided with a radial hole (27) for receiving a grub screw to enable the inner bearing to be fastened onto a shaft. In FIG. 3d the additional flange (30) is engageable with a collar (33) which has a hole (27) for receiving a grub screw.

As shown in FIG. 3e the inner bearing means may include two sleeve portions (34,35) each provided with a collar (3,4) and a portion of the peripheral bearing surfaces (2) and the sleeve portions are engageable such that the peripheral bearing surfaces (2) are adjacent and located between spaced apart collars (3,4).

FIG. 4 shows a further embodiment of the invention in which the outer bearing (6) has an internally disposed locating flange (36) which extends across substantially the entire axial width thereof. The inner bearing (1) includes a peripheral bearing surface (2) and two collars (3,4) which extend one on each side of the locating 36 flange (7) of the outer bearing (6). One of the collars (4) may be removable as shown in FIG. 2.

The intermediate bearing includes a bearing ring (10), inner bearing bush (13) in the form of a sleeve having an inner bearing surface adjacent the bearing surface of the inner bearing (13) and an outer bearing surface adjacent the inner bearing surface of the bearing ring (10).

The outer bearing bush member (16) includes axial bearing surfaces on its inner and outer circumference the inner bearing surface being adjacent the bearing ring (10) and the outer bearing surface being adjacent the bearing surface on the inner circumference of the flange of the outer bearing (6). The outer bearing bush also includes two pairs of lips (37,38) one pair (37) disposed on the outer circumference at each end of the outer bearing bush (16) and one pair (38) disposed on the inner circumference at each end. The pair of lips (37) on the outer circumference extend between facing sides of the flange (36) and collars (3,4) and the pair of lips on the inner circumference (38) extending one on either side of the bearing ring (10) to provide a radial being surface between the bearing ring (10) and collars (3,4).

Figure 5B:
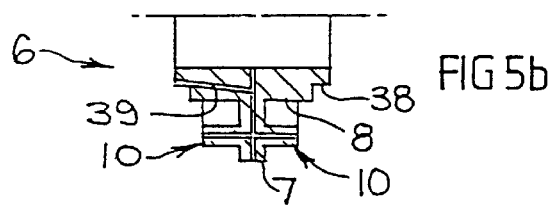
FIG. 5b shows a part cross section view of a further example of an alternative outer bearing means for the bearing of the FIG. 1.

FIGS. 5a and 5b shows an outer bearing means (6) which includes a internally disposed locating flange (7). The bearing rings (10) is fixed one each side of the flange (7) for rotation with the outer bearing (6) such that bearing bush is receivable adjacent each of the inner and outer circumference of the bearing ring. The collars of an inner bearing (not shown) will be spaced apart from the distal ends of the bearing rings. In FIG. 5b the outer bearing means inner circumference (8) is provided with annular recessed portions (38) each end for receiving the peripheral end of the collars (3,4) from the inner bearing (1) such that the collars (3,4) are spaced from the distal ends of the bearing rings (10). The outer bearing (6) may also include channels or holes (39) for heat transfer or to allow the passage of a lubricant or cooling liquid.

Figure 5C:
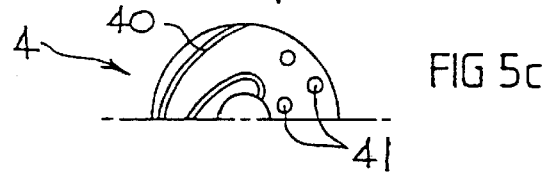
FIG. 5c is an inside perspective view of an alternative thrust collar of the bearing of FIG. 1.

FIG. 5c shows the inner side of a thrust collar (4) from an inner bearing (1) the thrust collar may be provided with a helical groove (40) on its inner surface to facilitate the removal of any particles which may become lodged in the bearing through entry of foreign matter or through wear. The helical groove transports particulate matter to the peripheral end of the collar. The collar may also or alternatively include holes (41) to allow a liquid to enter the bearing. The holes may be use to facilitate washing of the bearing and will preferably be located in each of the collars and may be present in any of the bearing components to holes being parallel to or at an angle to the axis.

Figure 5D:
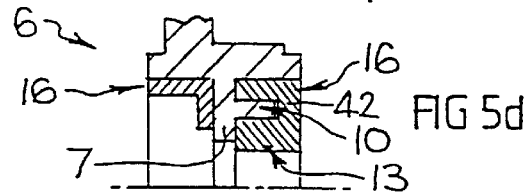
FIG. 5d is an axial cross section of a further embodiment of an outer bearing means and intermediate bearing means of the invention.

FIGS. 5d shows an outer bearing means (6) having an internal flange (7) and a bearing ring (10) fused on one side. Bearing bush includes rings (13,16) one (13) disposed adjacent the inner circumference of the bearing ring (10) and another (16) adjacent the outer circumference of the bearing ring (10) and the bush rings are joined by a web (42) extending adjacent the distal end of the bearing ring. The web (42) provides an axial bearing surface between the distal end of the bearing ring (7) and collar (not shown). The bush extend to be flush with the ends of the outer bearing (6) to provide a seal to inhibit the passage of foreign particles into the bearing. The other side of the flange is provided with a bearing bush (16) having a lip (20) in its inner circumference adjacent the flange (7) in accordance with the outer bearing bush (16) of FIGS. 1 and 2 except that the bush extends to the end of the outer bearing (6) and between in inner circumference of the outer bearing (6) and the end of the collar (3) to provide a seal.

Figure 5E:
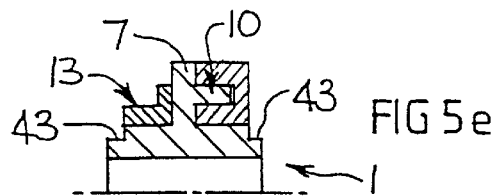
FIG. 5e is an axial cross section of a further embodiment of an inner bearing means and intermediate bearing means of the invention.

FIG. 5e shows an arrangement in which the inner bearing (1) includes a radial locating flange (7) on its outer circumference which is provided with a fused bearing ring (10). The ends of the inner bearing also includes annular recesses (43) to receive the periphery of a collar attached to an outer bearing. Bush components including inner and outer rings (13,16) are joined by a web (42) at a distal end of the bearing ring (10). The other side of the flange is provided with an inner bearing bush (13) with a lip on its outer circumference disposed adjacent the side of the flange (7). Recessed portions (43) are provided at each end of the inner bearing for receiving collars of outer bearing which are rotatable about the recessed portions (43).

Figure 6A:
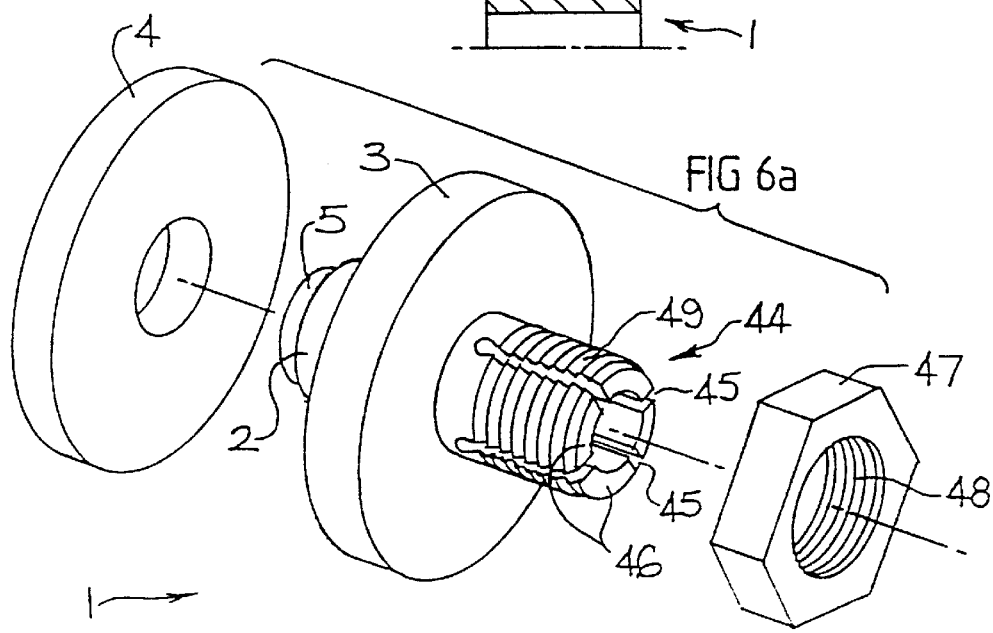
FIG. 6a is a partial perspective views of an inner bearing means of the invention which include means for fixing the bearing to a shaft.
Figure 8A:
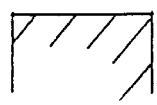
FIGS. 8a to 8g show the cross section of alternative shapes of outer circumference portion of the outer bearing means of the bearing of the invention.
Figure 8B:
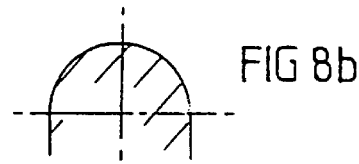
Figure 8C:
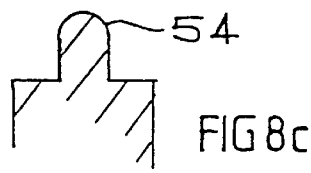

FIGS. 6a to 6f show inner bearing means (1) which is in the form of a sleeve having a bore for receiving a shaft. FIGS. 6a and 6b show an inner bearing means having a collar (3).

A bearing surface (2) is located on one side of the collar (3) with a thrust collar (4) being receivable on a recessed portion (5) on the other side of the bearing surface (2) to receive a flange and intermediate bearing means between the collars for rotation thereabout. The bearing surface (2) of the sleeve is preferably cylindrical.

The sleeve includes an annular constrictable portion (44) comprising a multiplicity of slots (45) extending through the sleeve at one end. The slots (45) are circumferentially spaced to provide a multiplicity of deformable portions (46). The sleeve narrowingly tapers toward the slotted end and the inner bearing is provided with a constrictor in the form of a locating nut (47). The inner circumference (48) of the locking nut and the outer circumference of the corstrictable portion of the sleeve have coacting threaded portions (48, 49).

To fasten the bearing on a shaft located in the sleeve the locking nut (47) is tightened upon the threaded constrictable portion (44) and thereby urged along the sleeve. The inner circumference (48) of the nut (47) provides an inward force on the tapered surface of the constrictable portion (44) causing an even inwardly deforming force on the segments (46) between the slots to lock the sleeve onto the shaft as shown in 6b. In an alternative embodiment the inner surface of the locking nut (47) narrowingly tapers to provide a constricting force to the constrictable portion (44) of the sleeve which may or may not include a tapered portion.

In the embodiment shown in FIGS. 6c to 6d the sleeve comprises a flange (7) and a bearing surfaces (2) on either side of the flange (7). The sleeve includes a constrictable portion (44) including a multiplicity of slots (45) which extend through the sleeve and provide deformable sections (46) there between which are inwardly tapered and/or have an inwardly tapered outer surface. The sleeve has a threaded portion (49) adjacent the constrictable portion (44) and a locking nut (47) comprises a coacting threaded portion (48) adjacent the end received on the sleeve and the coacting threaded portions urge the locating nut (47) onto the sleeve. The locking nut (47) includes an annular inner flange (50) which on tightening of the locking nut (47) on the sleeve urges the constrictable portion (46) inward to lock onto the shaft (51) as shown in 6d.

FIGS. 6e and 6f show a further arrangement in which the locking nut (47) is provided with a thrust collar (4) which may on assembling the bearing provide the thrust collar disposed on one side of a inward flange (7) on the outer bearing member (8). On assembling the bearing one set of intermediate bearing is located on the bearing surface. The outer bearing (6) is then slid onto the bearing surface (2) followed by the second set of intermediate bearing (9) and the thrust collar (4) is engaged with the thread of the sleeve (49) and may be tightened as shown in FIG. 6f to lock the bearing onto the shaft.

FIGS. 7a and 7b shows a portion of an inner bearing comprising a tapered or frustoconical sleeve (52) having a bearing surface (2) and an axial collar (3) at the large diameter end of the sleeve (2). A thrust collar (not shown) may be received on the smaller diameter end. The inner circumference of the sleeve may be provided with a spline or serrations (53) or other components for engaging a drive shaft or the like.

FIG. 7c shows a race portion of an inner bearing means which includes a sleeve (52) with a cylindrical bearing surface (2) and a collar (3) at one end. A thrust collar (not shown) is receivable at the other end of the sleeve. The bore of the sleeve is provided with spline or serrations (53) for receiving a drive shaft or the like.

FIGS. 8a to 8h show alternative configurations of a outer circumference of the outer bearing means (6). The outer circumference may be cylindrical as shown in 8a convex as shown in 8b particularly of spherical section as shown in 8f. The outer bearing may include a radial flange or radial protrusions (54) spaced about its outer circumference as shown in 8c. Recesses such as the concave or V-shape grooves may be present as shown in 8d and 8e. A peripheral tapered flange (55) adjacent one edge may be useful in a roller for a conveyor belt or the outer bearing means may be a cam as shown in 8h.

Figure 9A:
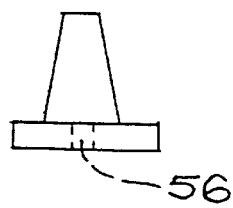
FIGS. 9a to 9f are perspective view of housings within which embodiments of the bearing of the invention may be received.
Figure 9B:
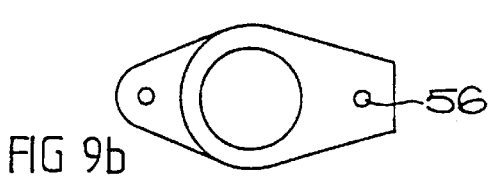
Figure 9C:
Figure 8D:
Figure 8E:
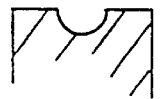

The outer bearing may be in the form of a housing as shown in FIGS. 9a to 9d such as a pillar block housing (FIG. 9a) a two flange housing (FIG. 9b) or four flange housing (FIG. 9c) having holes (56) for fifing the housing. The outer bearing may also be in the form of a sprocket or geared when as shown in FIGS. 9c and 9f.

Figure 9D:
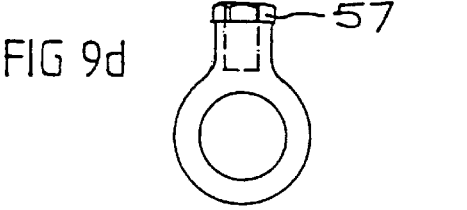
Figure 8F:
Figure 8G:
Figure 9E:
Figure 8H:
FIG. 8h shows an outline of the bearing of the invention in the form of a cam.
Figure 9F:

In an alternate embodiment the outer bearing means is receivable into a housing of one of the shapes shown in FIGS. 9a to 9f. The outer bearing may be admitted to the housing by using a split housing and the outer bearing may have a convex outer circumference or be of spherical section (see FIG. 8f) and the housing may have a concave inner circumference of corresponding section to allow the outer bearing to pivot within the housing to align with a shaft or the like. A hanger type housing is depicted in FIG. 9d and includes for engaging an article (57) to be suspended from a conveyance line to be engaged by the outer bearing.

A particular advantage of the preferred bearing of the invention shown in FIGS. 1 and 2 is that each of the intermediate bearing components including the bearing bushes and bearing ring are rotatable with respect to one another which significantly reduces wear and minimises build up of heat. Between the inner and outer bearing there are at least four pairs of radial bearing surfaces and at any time, during operation of the bearing, there may be relative rotation at any one or more of these pairs of surfaces. Each of the components of the intermediate bearing means may rotate at a different speed to the inner or outer bearing means and other components. Further, on the build up of friction and heat between a portion of bearing surfaces they tend to stick together and the presence of a multiplicity of pairs of bearings surfaces allows the bearing rings to rotate intermittently or and/or at different speeds to one another. The bearing ring and bushes therefore appear to float.

The bearing component and in particular the bearing ring and inner and outer bushes evenly distribute friction and wear and provide more effective dissipation of heat effectively eliminating the incidence of ceasure even at high speed and under great loads.

The presence of load forces in the axis of the bearing generally exacerbates the problems of wear and ceasure in conventional plain bearing. In the present invention the presence of lips on the bushes which extend between the bearing ring and collar and the locating flange and bearing ring to provide four pairs of bearing surfaces on each side of the locating flange. The bearing of the invention therefore provides excellent resistance to wear from axial loads.

The use of a bearing as the wheel hub of a heavy vehicle provides a severe test of its performance and despite the existence of plain bearings for many years the bearings used in the wheels of vehicles are generally bearings containing roller balls.

A bearing according to FIG. 1 and FIG. 2 above was constructed using an inner bearing, outer bearing means and bearing ring constructed of aluminum impregnated with PTFE.

The bearing bushes were prepared from polyimide. The bearing was used in the wheel hub of a 1½ tonnes off road vehicle which was driven at speeds of over 30 miles per hour in swampy terrain frequently being submerged in sea water. The bearing was also used in the wheel hub of a trailer with a total loaded weight 3 tonnes. In each case the bearing performed excellently showing little or no sign of wear after extended use.

Vehicle wheels of the present invention are suitable for use in vehicles used in detecting mines and explosives as they do not generate static electricity. This feature also makes the bearing of the invention desirable for use in scientific instruments in underground mining operations or in other circumstances where it is desirable to guard against static electricity and or the use of ferrous metals or their alloys.

I claim:

1. A bearing assembly comprising:
   an inner bearing member, an exterior of said inner bearing member defining a peripheral bearing surface;
   an outer bearing member having a central bore coaxial with said inner bearing member and through which said inner bearing member passes, an interior surface of said outer bearing member defining an inner bearing surface, said peripheral bearing surface and said inner bearing surface defining an annular region therebetween;
   at least one intermediate bearing member provided in said annular region, coaxial with and radially intermediate said inner and outer bearing members, said at least one intermediate bearing member including:
      a first bush ring member rotatably mounted relative to said peripheral bearing surface of said inner bearing member;
      a second bush ring member rotatably mounted relative to said inner bearing surface of said outer bearing member; and
      a bearing ring in bearing contact with and rotatably disposed relative to each of said first and second bush ring members;
   wherein said first and second bush ring members are constructed and arranged so as to be intermittently rotatable relative to said peripheral bearing surface and said inner bearing surface, respectively.

2. The bearing assembly according to claim 1, further comprising:
   two said intermediate bearing members,
   a pair of collars provided at respective axial ends of said outer bearing member, thereby defining axial end walls of said annular region defined by said peripheral bearing surface of said inner bearing member and said inner bearing surface of said outer bearing member,
   wherein one of said inner and outer bearing members includes a locating flange extending radially towards the other one of said inner and outer bearing members and having a radial bearing surface on each side thereof, said locating flange dividing said annular region, wherein each said intermediate bearing member is provided in respective divided portions of said annular region.

3. The bearing assembly according to claim 2, wherein at least one of said first and second bush ring members in said at least one intermediate bearing member is axially wider than said bearing ring and includes at least one protruding lip which cooperates with said bearing ring to space said bearing ring apart from facing sides of said locating flange and pair of collars.

4. The bearing assembly according to claim 3, wherein said first and second bush ring members in said at least one intermediate bearing member include at least two protruding lips, one said lip disposed between said bearing ring and said locating flange and another said lip disposed between said bearing ring and a respective one of said collars.

5. The bearing assembly according to claim 4, wherein one of said protruding lips extends radially outwardly from adjacent an axial end of said first bush ring member, and another one of said protruding lips extends radially inwardly from adjacent an axial end of said second bush ring member opposite said axial end of said first bush ring member, said protruding lips aligning said bearing ring and providing axial bearing surfaces between said bearing ring and said and outer bearing members, respectively.

6. The bearing assembly according to claim 5, wherein said protruding lips on said first and second bush ring members include a plurality of circumferentially spaced radially extending grooves.

7. The bearing assembly according to claim 2, wherein one of said first and second bush ring members of said at least one intermediate bearing member include a first end fused to one of said collars or said locating flange, and a second end spaced apart from the other of said one of said collars or said locating flange.

8. The bearing assembly according to claim 7, wherein said first and second bush ring members are joined by a web extending adjacent a distal end of said bearing ring.

9. The bearing assembly according to claim 2, wherein one of said pair of collars is a thrust collar.

10. The bearing assembly according to claim 9, wherein said inner bearing member has a flared annular recess, said flared annular recess being attached to said thrust collar.

11. The bearing assembly according to claim 9, wherein said inner bearing member includes an inner race stud having a threaded portion and being attachable to said thrust collar having a cooperating threaded portion.

12. The bearing assembly according to claim 1, wherein said bearing ring is rotatable with respect to both said inner and outer bearing members.

13. The bearing assembly according to claim 1, wherein said first and second bush ring members and said bearing ring are coaxial.

14. The bearing assembly according to claim 1, wherein said outer bearing member includes a plurality of circumferentially spaced holes allowing said outer bearing member to be fixed to a wheel.

15. The bearing assembly according to claim 14, wherein said inner and outer bearing members and said at least one intermediate bearing member are used as a hub of the wheel.

16. The bearing assembly according to claim 1, wherein said inner bearing member has an extended axial portion provided with radial holes.

17. The bearing assembly of claim 1, wherein said inner bearing member includes an axially extending sleeve provided with said peripheral bearing surface, said first bush ring member being rotatably mounted on said sleeve and having radially inner and radially outer bearing surfaces, said radially inner bearing surface of said inner bush ring being in bearing contact with said peripheral bearing surface;

wherein said second bush ring member includes radially inner and radially outer bearing surfaces;

wherein said bearing ring has radially inner and radially outer bearing surfaces and is rotatably mounted about said first bush ring member such that said radially inner bearing surface of said bearing ring is in bearing contact with said radially outer bearing surface of said first bush ring member, said second bush ring member being rotatably mounted about said bearing ring such that said radially inner bearing surface of said second bush ring member is in bearing contact with said radially outer bearing surface of said bearing ring, said radially outer bearing surface of said second bush ring member being in bearing contact with said inner bearing surface of said outer bearing member.

18. A bearing assembly according to claim 17, wherein at least one of said first and second bush ring members has a plurality of grooves.

19. The bearing assembly according to claim 17, wherein said bearing ring has a smaller axial width than at least one of said first and second bush ring members.

20. The bearing assembly according to claim 1, wherein said first and second bush ring members are constructed and arranged so as to be alternatingly rotatable.

21. The bearing assembly according to claim 20, wherein each of said first and second bush ring members is constructed and arranged so as to alternate between:

being relatively stationary with respect to a radially inner bearing surface thereof and relatively rotating with respect to a radially outer bearing surface thereof, and being relatively stationary with respect to a radially outer bearing surface thereof and relatively rotating with respect to a radially inner bearing surface.

22. The bearing assembly according to claim 20, wherein said first and second bush ring members are constructed and arranged so as to be generally alternatingly rotatable with some simultaneity of rotation.

23. The bearing assembly according to claim 1, wherein said inner and outer bearing members and said bearing ring are each made from a first material, and said first and second bush ring members are each made from a second material.

24. The bearing assembly according to claim 23, wherein one group amongst the group consisting of said first and second bush ring members and the group consisting of said inner and outer bearing members and said bearing ring is made from a plastic material and the other group is made from metal.

25. The bearing assembly according to claim 24, wherein each of said inner and outer bearing members and said bearing ring are made from metal and said first and second bush ring members are made from plastic.

26. The bearing assembly according to claim 25, wherein said first and second bush ring members are made from one of a polyimide, a polyester, PTFE, CTFE, PEEK, and ACETAL.

27. The bearing assembly according to claim 25, wherein said inner and outer bearing members and said bearing ring are made from one of stainless steel, aluminum, stainless steel coated with a ceramic, aluminum coated with a ceramic, and aluminum impregnated with PTFE.

* * * * *